Nov. 15, 1960 — R. R. LITTLE — 2,960,279
HOSE ROLLER
Filed Jan. 6, 1959 — 2 Sheets-Sheet 1
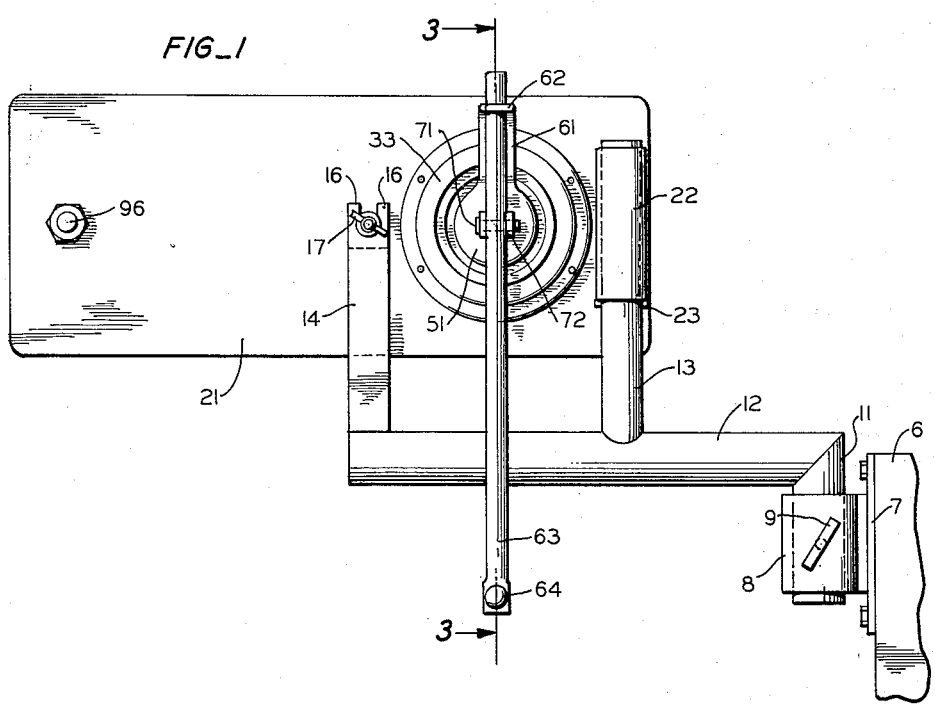
FIG_1
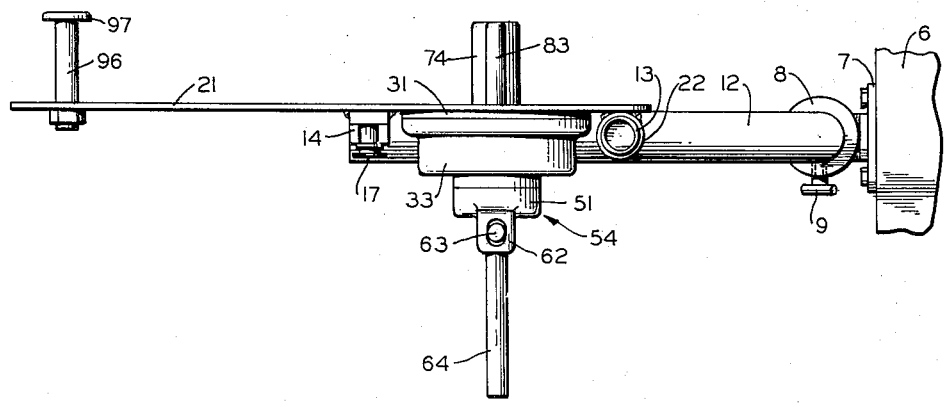
FIG_2
INVENTOR.
RAY R. LITTLE
BY Lothrop & West
ATTORNEYS Nov. 15, 1960  R. R. LITTLE  2,960,279
HOSE ROLLER
Filed Jan. 6, 1959  2 Sheets-Sheet 2
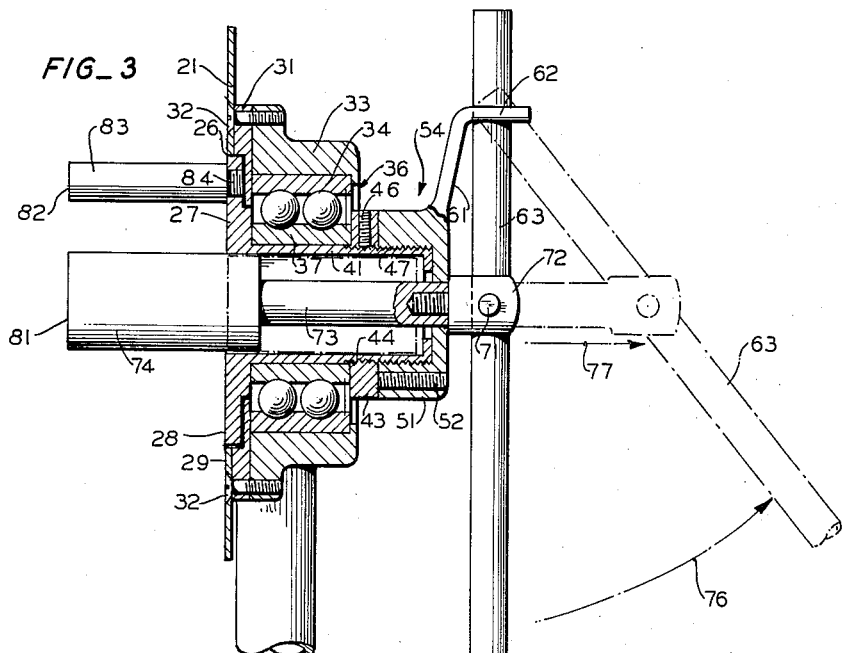
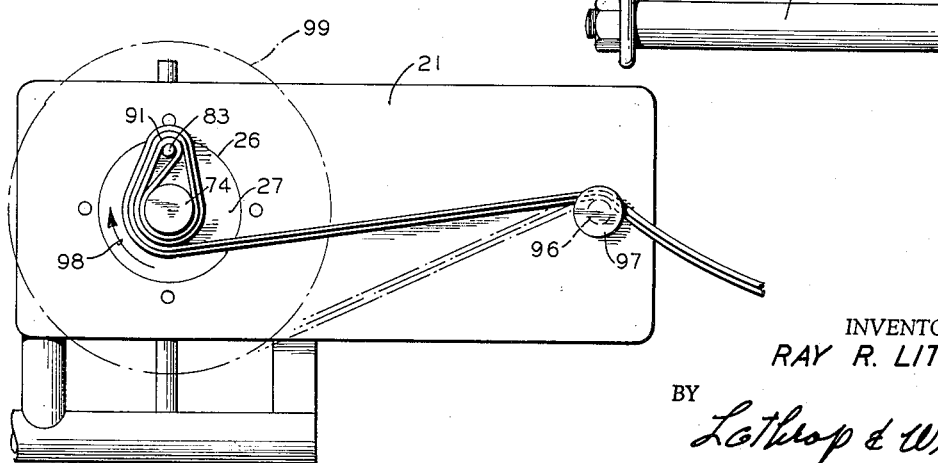
INVENTOR.
RAY R. LITTLE
BY Lothrop & West
ATTORNEYS

United States Patent Office 2,960,279
Patented Nov. 15, 1960

2,960,279

HOSE ROLLER

Ray R. Little, 5441 Tyler St., North Highlands, Calif.

Filed Jan. 6, 1959, Ser. No. 785,272

4 Claims. (Cl. 242—86.1)

The invention relates to reels for winding up lengths of fire hose, especially of the hose types used in fighting forest fires and, more particularly, to reels permitting of quick removal therefrom of the hose lengths which have been rolled.

Owing to the rugged terrain which often must be traversed in reaching and fighting the usual forest fire, as well as the factor of remoteness, extreme difficulties often arise in carrying and laying down water hoses. Recently developed techniques have shown that modular lengths of hoses which are tightly rolled in a special or looped fashion provide an especially effective transport unit when used in conjunction with certain apparatus forming no part of the device of the instant invention.

Hose rollers of the kinds suggested previously, both in the patent art and in the literature as well as those available in the market place, are unsuitable for the purpose since more often than otherwise these rollers do not permit the hose roll to be removed for transportation elsewhere. Still others are unable to roll the hose in the particularly overlapped or looped fashion required by the new techniques of forest fire fighting.

It is therefore an object of the invention to provide a hose roller which permits an operator to roll a hose very quickly and to remove the rolled hose with dispatch.

It is another object of the invention to provide a hose roller which is capable of rolling a hose in doubled or looped fashion.

It is yet another object of the invention to provide a hose roller which is effective to provide an opening in the center of the completed roll.

It is still another object of the invention to provide a hose roller which is relatively inexpensive yet which is rugged and long-lived.

It is a further object of the invention to provide a hose roller which is readily attachable to and detachable from a wide variety of transporting vehicles and carriers as well as being suitable to a bench or fixed type of operation.

It is still a further object of the invention to provide a generally improved hose roller.

Other objects, together with the foregoing, are attained in the embodiment described in the following description and shown in the accompanying drawings in which:

Figure 1 is a rear elevation;

Figure 2 is a top plan view;

Figure 3 is a section to an enlarged scale, the plane of section being indicated by the line 3—3 in Figure 1; and Figure 4 is a fragmentary front elevation showing in outline the envelope of the hose as rolling is completed.

While the hose roller of the invention is susceptible of numerous physical embodiments depending on the environment and requirements of use, substantial numbers of the herein shown and described embodiment have been made, used and exhaustively tested and all have performed in an eminently satisfactory manner.

Secured to any appropriate mounting member 6, for example the body of a truck, is a plate 7 having welded thereto a collar 8. A clamp 9 serves to lock a downturned portion 11 of a frame 12, or arm. Mounted vertically on the arm 12 is a pipe 13 and a strap 14, the strap 14 being bifurcated as at 16.

A wing nut 17 permits the strap 14 to be clamped to a rectangular, vertical frame plate 21, there also being a vertical collar 22 mounted on the plate snugly encompassing the vertical pipe 13 and thus detachably securing the plate 21 to the arm 12. A pin 23 inserted at an appropriate location through the pipe 13 serves to locate the collar 22 in proper position.

A circular opening 26 is formed in the plate 21, as can be seen most clearly in Figure 3, and in the circular opening 26 is disposed a circular disk 27, the disk having an outer face 28 substantially co-planar with the outer surface 29 of the plate 21.

The disk's periphery is spaced somewhat from the adjacent wall of the plate to permit free rotation of the disk. Comparable clearance is also provided between the disk 27 and an annular spacer 31, or flange, secured to the plate 21 as by fastenings 32. Likewise secured to the spacer 31 is a casing 33 enclosing the outer race 34 of an anti-friction bearing 36.

The inner bearing race 37 encompasses and is secured to a hollow sleeve 41 projecting inwardly from the disk 27. The inner race 37 is confined by a washer 43 in threaded engagement, as at 44, with the sleeve 41 and secured by a set screw 46.

Also in threaded engagement with the sleeve 41, as at 47 is a cap member 51 provided with a set screw 52 which assures that the cap rotates without slippage with respect to the washer 43, the bearing race 37 and the disk 27, these members being conjunctively termed a wheel and designated by the numeral 54.

Upstanding from the margin of the inner end of the cap 51 is an arm 61 terminating at its distal end in a loop 62, or eye, or ring, within which is loosely disposed the upper portion (see Figure 3) of a crank arm 63, a crank handle 64 being mounted on the other end.

The crank arm is pivotally mounted as by a pin 71 to a clevis 72 secured to and projecting from the inner end of a hub stem 73 attached to the inner end of a hub 74 translatable within the sleeve 41.

It now becomes apparent, as can be seen by especial reference to Figure 3, that as the crank is rotated, not only the wheel 54, including the disk 27, turns, but also the hub 74 as well.

Furthermore, by swinging the crank in the direction shown by the arrow 76 to the attitude indicated in outline in Figure 3 the hub is axially retracted in the fashion shown by the arrow 77. It is likewise clear that as the clevis 72 is urged into the position it assumes in outline in Figure 3 that the upper end of the crank arm 63 slides downwardly through the loosely encircling eye 62, or ring, and takes the position substantially as shown in outline in Figure 3.

In its fully retracted position, the outer end 81 of the hub 74 is substantially co-planar with the adjacent face 28 of the disk 27. In its fully extended position, however, the outer end 81 of the hub is co-extensive with the outer end 82 of a stud mounted perpendicularly on the disk 27, as by threads 84, adjacent the periphery of the disk and vertical above the hub 74.

It is believed appropriate to note at this juncture that gravity tends to urge the crank arm into a vertical attitude, both axially and polarly, as it appears most clearly in Figure 3. The effect of this is two-fold. It not only tends to set the empty roller in proper angular attitude with the stud 83 in its fixed or predetermined angular position relative to the hub, but it also tends to urge the hub into fully extended position preparatory to rolling. If desired, the hub 74 can be additionally urged outwardly by a coil spring (not shown) surrounding the hub stem 73 within the sleeve 41 and abutting the end of the cap member 51 and the end of the hub 74.

Rolling is effected by first doubling the hose on itself and then inserting the loop 91, formed by such doubling, over the stud 83.

Next, the doubled hose is reaved around the lower portion of the retractable hub 74 (see Figure 4), the hub 74 being in extended position, and is draped on the top of a hose-supporting stud 96 having an end flange 97. The stud 96 is mounted perpendicularly on the plate 21 remote from the reel structure and serves to help feed the hose onto the reel as the reel is rotated, for example in the direction indicated by the arrow 98 in Figure 4.

The free ends of the doubled hose are, in customary fashion, provided with coupling members (not shown).

As soon as rolling is completed and the full roll has assumed substantially the outline indicated by the numeral 99 in Figure 4, the crank arm 63 is swung outwardly, as appears in Figure 3, causing the hub 74 to retract into the hollow sleeve until the outer end 81 of the hub is flush with the disk 27 and the plate 21.

Thereupon, the entire roll can easily be withdrawn from the fixed stud 83. At this juncture, it is sometimes found convenient to tie or bind the roll to prevent its unrolling; and the roll can then be taken either to storage or it can be located for direct transportation to the fire.

It can be seen that the hose roller of the invention provides an apparatus which yields a firm and well-made roll. Once in the field, the roll is reinserted on a pipe or other convenient member, the pipe being inserted through the opening left by the retractable hub. The couplings are thereupon joined to the mating couplings of adjacent rolls. Then, as the hose is run out, the rolls freely rotate and, as the loop end 91 of each of the hoses is reached, the loop 91 is quickly paid out since it is a free loop; that is to say, the loop is not looped over anything as it was in the winding or reeling step.

The device of the invention has been used under many varying and trying tests and has uniformly shown itself to be a definite advance in apparatus of this nature.

What is claimed is:

1. A hose roller comprising a frame including a plate having a planar surface, a wheel rotatably mounted on said frame, said wheel including a circular disk disposed in a circular opening in said plate, said disk having a face substantially co-planar with said planar surface, a stud mounted on said face of said disk adjacent the periphery of said disk, a hub retractably mounted on the axis of rotation of said wheel, said hub being movable between a first projected position wherein the outer end of said hub is co-extensive with said stud and a second retracted position wherein said outer end of said hub is substantially co-planar with said face of said wheel, and a crank arm connected to said wheel for angular movement between a first inner position and a second outer position with respect thereto, said crank arm being rotatable with said wheel in said first inner and said second outer positions, said crank arm also being connected to said hub for movement therewith whereby movement of said crank arm between said first inner and said second outer positions effects a corresponding movement of said hub between said first projected position and said second retracted position of said hub.

2. The device of claim 1 wherein said wheel is further characterized by a hollow sleeve mounted on said disk to receive said hub, a stem mounted on the inner end of said hub, said crank arm being pivotally mounted on the inner end of said stem, and an eye member mounted on the inner end of said wheel, the eye of said eye member loosely encircling said crank arm adjacent one end thereof and forming a fulcrum therefor.

3. A hose roller comprising a supporting member, a plate detachably mounted on said supporting member, a wheel rotatably mounted on the inner side of said plate and extending through an opening in said plate, said wheel including an annular disk having its outer face substantially co-planar with the outer surface of said plate, a fixed projecting member mounted on said outer face of said disk adjacent the periphery of said disk, a retractable member mounted coaxially on said wheel, and means for retracting and extending said retractable member between a location wherein the outer end of said retractable member is co-planar with said face of said disk and a location wherein said outer end is co-extensive with the outer end of said fixed projecting member.

4. The device of claim 3 further characterized by a second fixed hose supporting member mounted on said plate at a location removed from said wheel.

References Cited in the file of this patent

UNITED STATES PATENTS

| | | |
|---|---|---|
| 1,831,526 | Dallas | Nov. 10, 1931 |
| 2,396,451 | Warkentin | Mar. 12, 1946 |
| 2,532,171 | Kaim | Nov. 28, 1950 |